United States Patent Office 2,917,559
Patented Dec. 15, 1959

2,917,559

HYDROFLUORINATION OF PROPYLENE

Richard F. Sweeney and Cyril Woolf, Morristown, N.J., assignors to Allied Chemical Corporation, New York, N.Y., a corporation of New York No Drawing. Application September 11, 1958
Serial No. 760,307

5 Claims. (Cl. 260—653.6)

This invention relates to processes for making isopropyl fluoride, $CH_3CHFCH_3$ (B.P. minus 10° C.) by direct hydrofluorination of propylene (B.P. minus 47° C.).

Isopropyl fluoride is a long and well known material useful, for example, in the promotion of catalytic transformation of hydrocarbons in the petroleum industry, and as an intermediate in the preparation of other fluoro compounds.

In prior manufacture of isopropyl fluoride, it has been proposed to react in liquid phase propylene and HF at temperatures below 0° C. and at substantial superatmospheric pressures. Even at notably low temperatures, such as minus 30° C., high boiling propylene polymers are formed resulting in reduced yields of sought-for isopropyl fluoride, the polymerization effect increasing with rise in reaction temperature. It has also been proposed to make isopropyl fluoride by gas-phase reaction of propylene and HF in the presence of supported metal fluoride catalysts, the catalysts being the fluorides of metal such as zinc, manganese, cobalt, iron and aluminum. Such gas-phase operations have been carried out at reasonably high temperatures, and more importantly at substantially high pressures of the order of 50 atmospheres and higher. Thus, prior proposals are characterized by low temperature liquid phase mostly batch operations, low yields caused by polymerization, and high pressures whether operation be carried out in liquid or gas phase. Prior art operating factors such as necessity for refrigeration, low yields resulting from polymerization, and maintenance of high pressures are disadvantages which are obvious.

A major object of the present invention lies in provision of a solid catalyst, gas-phase method for making isopropyl fluoride by HF fluorination of propylene by procedure involving none of the above disadvantages.

Having in mind major prior art operational deficiencies such as low temperatures, high loss of propylene as polymers, low yield of isopropyl fluoride, and maintenance of high pressures, surprisingly it has been found, in accordance with the invention, that activated carbon of itself possesses the properties of effectively promoting reaction of anhydrous HF and propylene by an easily controllable, all gas-phase catalytic procedure in accordance with which isopropyl fluoride may be made in high yields. Of dominant importance, from standpoint of simple operation, we find that activated carbon promotes the reaction at substantially atmospheric pressure. Moreover, we have found that activated carbon makes possible the use of surprisingly low reaction temperatures. Further, it has been found that activated carbon as catalyst shows no discernible tendency, when employed under the conditions indicated herein, to promote side reactions which would result in low yields of isopropyl fluoride and loss of propylene starting material.

Reaction involved in practice of the invention is represented by—

The activated carbon catalysts which may be used in practice of the invention are granular materials readily available from several commercial sources, suitable materials being various grades of activated carbon such as Columbia 6G, Columbia SW, and Darco. Granular size of the activated carbon employed is not highly critical. Ordinarily, reaction is carried out in elongated tubular reactors, and in these instances it is desirable to employ activated carbon granules of average mesh size between $\frac{1}{25}$ and $\frac{1}{4}$ of the reactor diameter, and better conditions are those in which a reactor is substantially completely filled with granules of average mesh size of about $\frac{1}{8}$ or $\frac{1}{10}$ of the diameter dimension of the reactor.

A major advantage arising out of the discovery of the properties of activated carbon with regard to promotion of the propylene-HF reaction lies in the low temperatures at which reaction may be carried out. We find that when using the activated carbon as catalyst the propylene-HF reaction is mildly exothermic. This mild exothermic reaction characteristic affords the advantage of making possible the use of a tubular reactor not necessarily provided with any controllable heating or cooling means. While in some circumstances it might be desirable to employ reactors equipped with e.g. jacketed means to facilitate controlled cooling or heating of the reaction zone, for any given operation it is a simple matter to design a reactor which includes no reaction heating or cooling provision, exposed surfaces of the reactor being such that the small amount of excess heat resulting from the exothermic reaction may be conveniently dissipated to the atmosphere.

Reaction zone temperatures may lie in the range of from something permissibly below the 19.4° C. boiling point of anhydrous HF up to about 200° C. Such temperatures may be as low as say 5–10° C., but in such instances when temperatures are below the boiling point of HF, the mol ratio of HF to propylene fed to the reactor should be such that the HF is present in not more than one molecular proportion per mol of propylene in order to insure the presence of all reactants in the reactor in the gas phase. While permissible, reaction zone temperatures below about 20° C. afford no advantage, and in any practical procedure reaction zone temperatures above 20° C. are preferable. Critical maximum reaction zone temperature is the temperature at which the reaction tends to reverse, and such temperature in some instances may be as much as or in excess of about 350° C. However, to insure against side reactions we find that reaction temperatures above about 200° C. are undesirable. Moreover, temperatures even this high, while affording no marked disadvantages with regard to yield, provide no particular advantages. One of the outstanding advantages afforded by the invention is a low temperature range which is wholly adequate in all respects. When using above mentioned reactors which permit reasonable heat dissipation to the atmosphere, reaction zone temperatures more or less automatically take care of themselves and lie substantially in the preferred range of 20–100° C. The operating advantages provided by these low temperatures are obvious in themselves, and further permit use of reactors equipped with no heating or cooling means.

A second outstanding advantage arising from the invention is that the reactions may be carried out at substantially atmospheric pressure as distinguished from the high superatmospheric pressures characteristic of the prior art. It will be understood that in the practice of gas-phase catalytic processes of the general type described herein, i.e. processes in which a gas stream is flowed successively thru reaction and product recovery systems, for all practical purposes, as relate to reactions themselves, pressure is considered as being substantially atmospheric.

Technically, however, pressures in such systems are sufficiently on the positive side to effect commercially satisfactory gas flow through the apparatus train. Thus, strictly speaking, depending upon factors such as apparatus design, mesh size of catalyst, unpacked gas space in the reactor, desired contact time, etc., actual pressures in systems of the kind under consideration may vary from 2 up to say 10–15 pounds' gauge, and accordingly operations of this type are included in the designation of substantially atmospheric pressure.

With regard to mol ratio of HF to propylene starting material, theoretical requirements are approximately one mol of HF per mol of propylene. Less than theoretical quantities of HF may be employed particularly in any instance in which for some reason or other it might be desirable to operate the reaction zone at temperature less than the boiling point of HF. In such circumstances, the HF:propylene ratio may drop to as low as 0.5 mol of HF per mol of propylene, to facilitate maintenance of all reactants in the reaction zone in the vapor phase. Such procedure is not preferred because of poor propylene utilization. Best results with respect to the amount of propylene reacted per pass are effected by use of HF in excess of theory. Substantially complete utilization of propylene charged is effected for an HF:propylene mol ratio of or exceeding 2:1, although good conversions of propylene may be obtained at lower HF:propylene ratios. Because of the relative ease of recovery of unreacted HF by simple distillation from the products, in order to obtain most desirable utilization of propylene, the preferred HF:propylene mol ratios lie in the ratio of 1:1 to 3:1.

Contact time may be varied considerably without noticeable disadvantage to high process efficiency. Generally, increasing contact time and reactor temperature results in higher HF utilization and conversion of propylene to isopropyl fluoride, the lowering of contact time and reactor temperature results in lower HF utilization and propylene conversion. Contact times may lie in the range of 0.1–60 seconds, and more usually and preferably in the range of 1–40 seconds. To a substantial extent, contact time, reactor temperature and ratio of reactants are interrelated, and depending upon apparatus and the particular operation at hand, optimum conditions as to contact time may be determined by test runs.

Generally, practice of the invention involves subjecting gaseous propylene to the action of gaseous substantially anhydrous HF at substantially atmospheric pressure and while in the presence of a catalyst consisting of activated carbon, and recovering isopropyl fluoride from the resulting reaction products. More particularly, gaseous propylene and preferably gaseous anhydrous HF are continuously metered, mixed and fed into a tubular reactor which preferably is packed full with activated carbon catalyst and which is made of suitable material such as nickel, Monel, and steel, and optionally equipped with jacketing if desired to provide for automatic heating or cooling means for reaction zone temperature maintenance. A plurality of reactors connected in series or parallel may be used if desired. Product recovery may be effected more or less conventionally as in this art. For example, the entire reactor exit may be condensed in a receiver by suitable cooling, such as by the use of Dry Ice-acetone mixture, and then fractionally distilled in suitable steel equipment to facilitate recovery of sought-for product and separation of unreacted materials which may be recycled. Alternatively, the reactor exit gases may be passed thru a water scrubber to remove HF. The exit gas of the scrubber may be dried e.g. by desiccants such as Drierite or calcium chloride, the dried gas then being condensed, followed by suitable distillation of the condensate.

In the following Examples 1 and 2, the reactor consisted of a 2" I.D. 39" long nickel pipe. No provision was made to heat or cool the reactor, some of the heat generated by the mildly exothermic reaction being dissipated to the atmosphere by radiation. The catalyst employed was activated carbon (commercially available Columbia 6G grade) sized such as to provide granules of average mesh size of about $\frac{1}{20}$ of the reactor diameter. The reactor was completely filled with catalyst, the total volume amounting to approximately 2 liters. Pressure in the reactor system was about 2 lbs./sq. in. gauge, i.e. sufficient to move the gas stream thru the reactor system at the contact time indicated and thru the remainder of the apparatus train.

*Example 1.*—During a period of about 3¾ hours, about 314 g. (7.47 mols) of propylene and about 446 g. (22.3 mols) of gaseous anhydrous HF were premixed and passed into and through the reactor. Maximum internal temperature in the reactor was about 56° C. Contact time was about 36 seconds. Products exiting the reactor were water-scrubbed to remove excess HF. The off-gas of the scrubber was dried by passage thru a tower filled with Drierite, and the tower exit was condensed in a trap cooled by a Dry Ice-acetone mixture. A total of 300.0 g. (15.0 mols) of HF were scrubbed from the exit gas. A total of 458.2 g. of condensate were recovered as condensate in the Dry Ice trap receiver. There was no evidence of polymer formation. Distillation of the condensate gave 2.8 g. (0.066 mol) of propylene, and 450.8 g. (7.27 mols) of a fraction boiling in the range of minus 9.5-minus 11. Infrared absorption spectrum and gas chromatography established such faction as being substantially pure isopropyl fluoride. The conversion of propylene was about 97%, and yield of isopropyl fluoride based on propylene converted was about 98%.

*Example 2.*—During a period of about 2 hours, about 393 g. (9.36 mols) of propylene and about 558 g. (27.9 mols) of anhydrous HF were premixed and passed into and through the reactor. Maximum internal temperature in the reactor was about 56° C. Contact time was 15 seconds. Products exiting the reactor were handled as in Example 1. A total of 379 g. (18.9 mols) of HF were scrubbed from the exit gas. A total of 558.3 g. of condensate were recovered from the cold trap receiver. There was no evidence of polymer formation. Distillation of the condensate gave 16.2 g. (0.386 mol) of a fraction boiling substantially as in Example 1. Infrared absorption spectrum and gas chromatography analysis showed the fraction to be substantially pure isopropyl fluoride. Conversion was about 92% and yield of isopropyl fluoride based on propylene converted was about 96%.

In the following Examples 3 and 4, the reaction system comprised two reactors. The first was a 2" I.D. 15" long Monel pipe directly coupled in series to a second reactor which was a 1" I.D. 36" long nickel pipe. No provision was made to heat or cool the reactors, some of the heat generated by the mildly exothermic reaction being dissipated to the atmosphere by radiation. The catalyst employed was activated carbon (commercially available Columbia 6G grade) which provided in the first reactor granules of average mesh size of about $\frac{1}{20}$ of the reactor diameter, and in the second reactor granules of average mesh size about $\frac{1}{10}$ of the reactor diameter. Each reactor was completely filled with catalyst, total of catalyst of both reactors being about 1.2 liters, 749 cc. of catalyst in the first reactor and 463 cc. in the second. Pressure in the reactor system was substantially as in Examples 1 and 2.

*Example 3.*—During a period of about 7 hours, 785 g. (18.7 mols) of propylene and 1370 g. (68.5 mols) of gaseous anhydrous HF were premixed and passed into and thru the reactor system. Maximum internal temperature in the first reactor was about 49° C., and in the second reactor maximum temperature was in the range of 25–30° C. Overall contact time was about 14 seconds. Products exiting the second reactor were handled as in Example 1. The trap product, identified by analysis including infrared absorption spectra as isopropyl fluoride containing a small quantity of propylene, amounted to 1118 g. There was no evidence of any polymer formation. The yield of isopropyl fluoride based on the quantity of propylene fed was about 95–96% of theory.

*Example 4.*—During a period of about 7⅔ hours, 881 g. (21 mols) of propylene and 1197 g. (60 mols) of gaseous HF were premixed and passed into and thru the reactor system. Maximum internal temperature in the first reactor was about 51° C., and in the second reactor maximum temperature was in the range of about 25–30° C. Overall contact time was about 16 seconds. Products exiting the second reactor were handled as in Example 1. The Dry Ice-acetone trap condensate, identified by analysis including infrared absorption spectra as isopropyl fluoride containing a small quantity of propylene, amounted to 1166 g. There was no evidence of polymer formation. Yield of isopropyl fluoride based on the quantity of propylene fed was about 90% of theory.

We claim:

1. The process for making isopropyl fluoride in a gas-phase reaction which comprises subjecting gaseous propylene to the action of gaseous substantially anhydrous HF, at substantially atmospheric pressure and while the presence of a catalyst consisting of activated carbon, and recovering isopropyl fluoride from the resulting reaction products.

2. The process for making isopropyl fluoride in a gas-phase reaction which comprises subjecting gaseous propylene to the action of gaseous substantially anhydrous HF, at reactive temperature not in excess of about 200° C., at substantially atmospheric pressure, and while in the presence of a catalyst consisting of activated carbon, and recovering isopropyl fluoride from the resulting reaction products.

3. The process of claim 2 in which temperature is substantially in the range of 20–100° C.

4. The process of claim 2 in which mol ratio of HF to propylene is substantially in the range of 1:1–3:1.

5. The process for making isopropyl fluoride in a gas-phase reaction which comprises subjecting gaseous propylene to the action of gaseous substantially anhydrous HF, at temperature substantially in the range of 20–100° C., mol ratio of HF to propylene being substantially in the range of 1:1–3:1, and while at substantially atmospheric pressure and while in the presence of a catalyst consisting of activated carbon, and recovering isopropyl fluoride from the resulting reaction products.

References Cited in the file of this patent

UNITED STATES PATENTS 1,996,115     Lazier  ---------------- Apr. 2, 1935